United States Patent [19]

Sakakibara et al.

[11] Patent Number: 5,020,096

[45] Date of Patent: May 28, 1991

[54] IMAGE COMMUNICATION SYSTEM HAVING IMPROVED LINE CONTROL

[75] Inventors: Kenzo Sakakibara, Yokohama; Takehiro Yoshida, Tokyo; Kozo Toda, Yokohama, all of Japan

[73] Assignee: Canon Kabushiki Kaisha, Tokyo, Japan

[21] Appl. No.: 465,652

[22] Filed: Jan. 22, 1990

Related U.S. Application Data

[63] Continuation of Ser. No. 167,253, Mar. 11, 1988, abandoned.

[30] Foreign Application Priority Data

Mar. 12, 1987 [JP] Japan ................................ 62-55416

[51] Int. Cl.$^5$ .............................................. H04N 1/32
[52] U.S. Cl. ..................................... 379/100; 379/96; 358/402; 358/444; 358/468
[58] Field of Search ............................. 379/93, 96–98, 379/100; 358/402, 408, 436, 438, 442, 444, 468

[56] References Cited

U.S. PATENT DOCUMENTS

| | | |
|---|---|---|
| 4,353,097 | 10/1982 | Takeda et al. . |
| 4,677,660 | 6/1987 | Yoshida . |
| 4,685,123 | 8/1987 | Hsia .......................................... 379/93 |
| 4,723,172 | 2/1988 | Matsumoto ......................... 358/256 |
| 4,773,080 | 9/1988 | Nakajima et al. . |
| 4,788,714 | 11/1988 | Hashimoto ........................... 379/102 |
| 4,800,439 | 1/1989 | Yoshino . |
| 4,815,121 | 3/1989 | Yoshida . |

FOREIGN PATENT DOCUMENTS 0183171  11/1982  Japan ..................................... 379/93

OTHER PUBLICATIONS

Canon FaxPhone, 1986.

Primary Examiner—Jin F. Ng
Assistant Examiner—Wing F. Chan
Attorney, Agent, or Firm—Fitzpatrick, Cella Harper & Scinto

[57] ABSTRACT

An image communication apparatus includes a plurality of speech or nonspeech communication terminals and a line controller for connecting the plurality of terminals to a communication line. Each of the terminals includes an image reader circuit for reading an original image, and the line controller includes a transmitter for transmitting image data by the image reader circuit to the communication line.

9 Claims, 5 Drawing Sheets

IMAGE COMMUNICATION SYSTEM HAVING IMPROVED LINE CONTROL

This application is a continuation of application Ser. No. 167,253 filed Mar. 11, 1988, now abandoned.

BACKGROUND OF THE INVENTION

1. Field of the Invention

The present invention relates to an image communication apparatus which can be connected to a plurality of speech communication terminals.

2. Related Background Art

In a conventional communication system, telephone sets and facsimile machines are connected to a predetermined transmission line such as one or a plurality of subscriber telephone lines.

A system of this type is used in an office. In this case, telephone sets are respectively installed on desks of the operators, and one or two facsimile machines are installed at other locations and can be commonly operated by a plurality of operators. Earlier filed patent applications associated with the system of this type and filed by the present applicant are U.S. Ser. No. 823,286 (filed Jan. 28, 1986) now U.S. Pat. No. 4,825,461, U.S. Ser. No. 108,915 (filed Oct. 15, 1987) and U.S. Ser. No. 106,783 (filed Oct. 13, 1987).

Although a line control function for controlling outgoing and incoming calls is commonly utilized in such a system, the communication function is effected by the telephone sets and the image communication function is effected by the facsimile machines. In this manner, two communication functions are perfectly independent in accordance with types of terminal devices due to the following reason.

When a telephone set is arranged together with a facsimile machine to constitute a single unit, the resultant device is too large to be installed on a desk. In addition, some operators do not want image communication. Therefore, the resultant terminal unit may include unnecessary functions.

When facsimile communication is performed in a communication apparatus, each operator moves from his desk to the installation place of the facsimile machine and must perform required operations, resulting in cumbersome, time-consuming operations.

Therefore, strong demand has arisen for a communication system wherein a terminal on an operator's desk is not excessively large, cost of the terminal device can be reduced, and image communication can be performed at the desk with simple operations.

SUMMARY OF THE INVENTION

It is an object of the present invention to solve the conventional problems described above.

It is another object of the present invention to improve an image communication apparatus.

It is still another object of the present invention wherein a plurality of speech communication terminals can be connected to an image communication apparatus and an image reader circuit is connected to each of the plurality of speech communication terminals.

It is still another object of the present invention to provide an image communication apparatus capable of being connected to a plurality of speech communication terminals, wherein image transmission can be performed from each speech communication terminal.

It is still another object of the present invention to simplify an arrangement of a system and to allow image transmission from each speech communication terminal.

The above and other objects, features, and advantages of the present invention will be apparent from the detailed description of a preferred embodiment in conjunction with the accompanying drawings.

DETAILED DESCRIPTION OF THE PREFERRED EMBODIMENT

The present invention will be described in detail with reference to a preferred embodiment in conjunction with the accompanying drawings.

Figure 1:
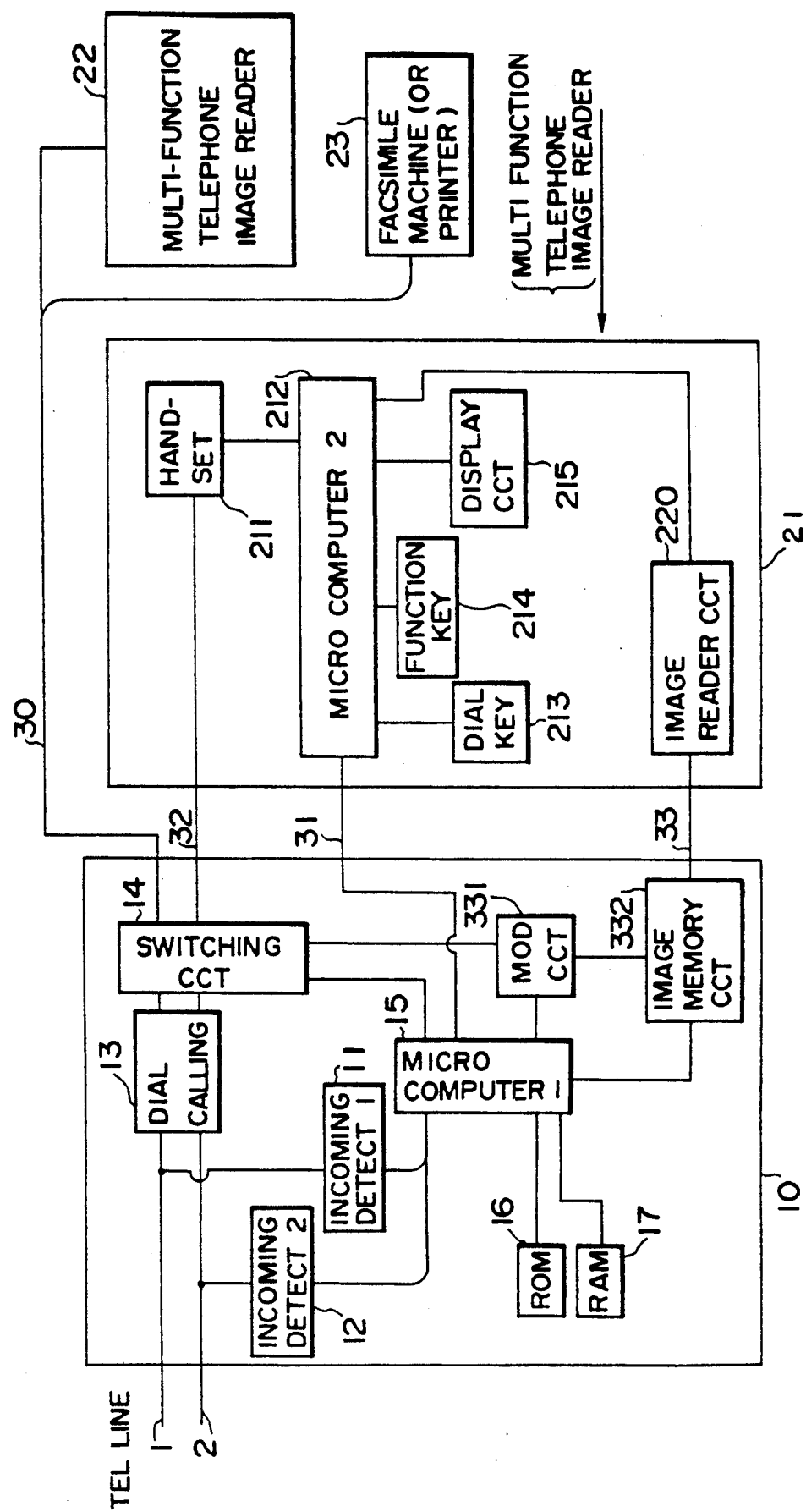
FIG. 1 is a block diagram of an image communication apparatus according to an embodiment of the present invention.

FIG. 1 shows an arrangement of a communication system according to an embodiment of the present invention. In a system, two multi-function telephone sets 21 and 22 and a facsimile machine 23 are connected to two telephone lines 1 and 2 through a line controller 10.

The line controller 10 is connected to the telephone lines 1 and 2 and includes incoming detectors 11 and 12 for respectively detecting incoming signals sent through the telphone lines 1 and 2. A dial calling circuit 13 is arranged in the line controller 10 to transmit a dial signal for controlling a switchboard for the telephone lines 1 and 2. A switching circuit 14 performs connection control of the multi-function telephone sets 21 and 22 and the facsimile machine 23.

The operations of the incoming detectors 11 and 12, the dial calling circuit 13, and the switching circuit 14 are controlled by a microcomputer 15. Control programs of the microcomputer 15 are stored in a ROM 16. Data necessary for calling a partner such as telephone numbers in abbreviated dialing are stored in a RAM 17.

In this embodiment, in order to transmit an image read by an image reader circuit 220 (to be described later) arranged in the multi-function telephone sets 21 and 22, there are arranged an image memory circuit 332 comprising memory elements such as a RAM for storing image data, and a modulation circuit 331 for transmitting image data stored in the image memory circuit 332. The modulation circuit 331 employs a predetermined modulation scheme defined by CCITT recommendations.

The multi-function telephone sets 21 and 22 have identical arrangements. Only the multi-function telephone set 21 is illustrated in FIG. 1.

As shown in FIG. 1, the multi-function telephone set 21 includes a handset 211 connected to the line controller 10 through a communication line 32 so as to allow an operator to talk to his partner. A microcomputer 212 is provided to effect various communication functions. The microcomputer 212 is connected to dial keys 213, function keys 214 comprising a plurality of keys and switches for effecting various communication functions, and a display circuit 215 comprising a liquid crystal display unit.

When the predetermined dial key 213 is operated, a predetermined signal is input from an input circuit of the predetermined dial key 213 to the microcomputer 15 in the line controller 10 through a control line 31. The microcomputer 15 controls the dial calling circuit 13 on the basis of the predetermined signal and outputs a dial signal to the telephone line 1 or 2, thereby calling the partner's terminal.

The function buttons 214 are used to effect various known communication functions, e.g., hand-free communication for allowing speech communication while the handset is hooked on, outside line catching abbreviated dialing, extension transfer, connection holding, and other communication control operations. In this embodiment, a remaining memory key is arranged to check a remaining memory data capacity of the image memory circuit 332 in the circuit controller.

When the multi-function telephone set 21 is used in an office, it is installed on a desk of each operator. The multi-function telephone set 21 includes an image reader circuit 220 so as to allow the operator to perform image transmission from his own desk.

The image reader circuit 220 comprises a CCD contact sensor as in the conventional facsimile machine. Image reading of the image reader circuit 220 is also controlled by the microcomputer 212. The read image data is input to the image memory circuit 332 in the line controller 10 through a signal line 33.

The multi-function telephone set 22 has the same arrangement as that of the multi-function telephone set 21 and is connected to the line controller 10 through signal lines 30. The signal lines 30 consist of the control line 31, the communication line 32, and the image data transmission signal line 33.

The facsimile machine 23 comprises an image reader circuit for reading an image, an image recorder, and a control circuit for receiving image to be received or transmitted, in the same manner as in the conventional facsimile machine, and is operated in the same manner as the conventional facsimile machine. In this embodiment, since image reading can be performed by each multi-function telephone set, the facsimile function can be omitted. In this case, the facsimile machine is used as a printer having an image reception function and an image recording function.

Figure 2:
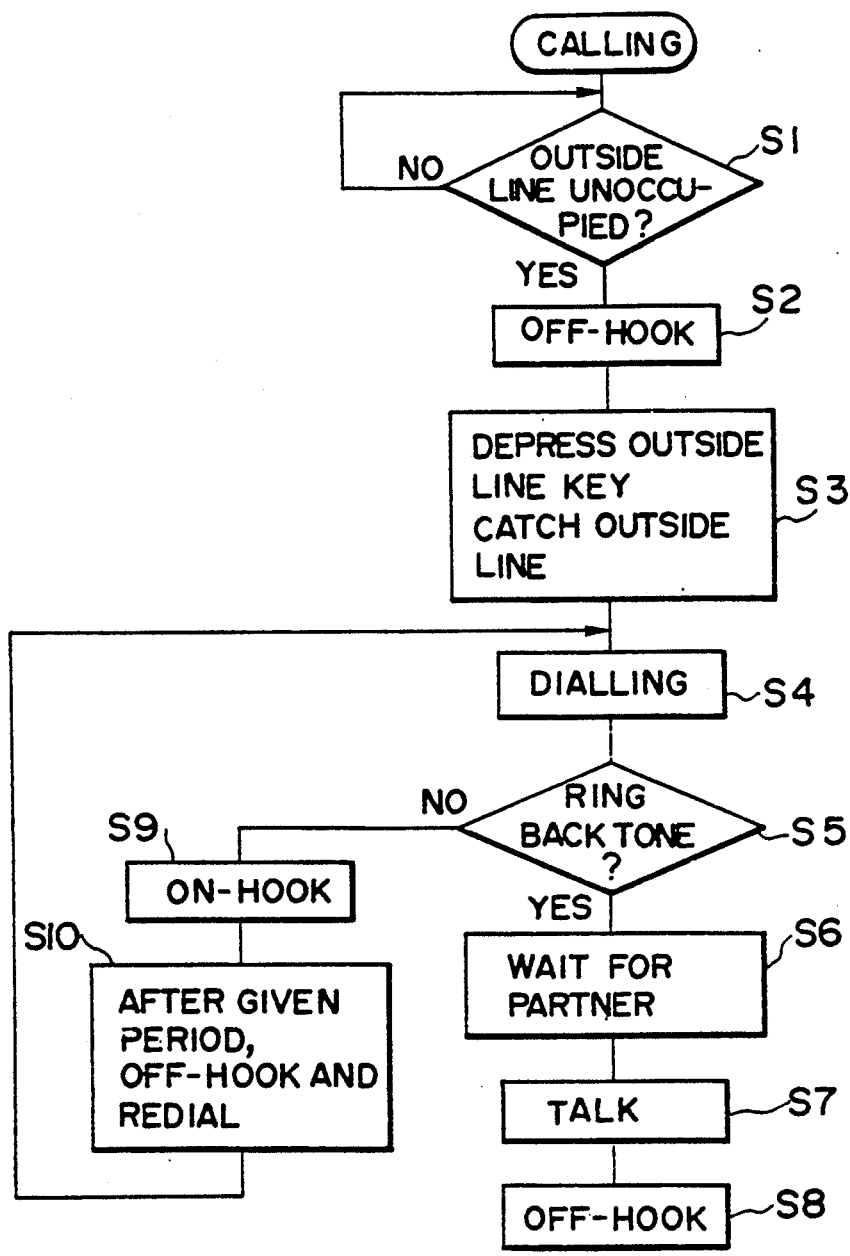
FIG. 2 is a flow chart showing sending procedures in the apparatus shown in FIG. 1.
Figure 3:
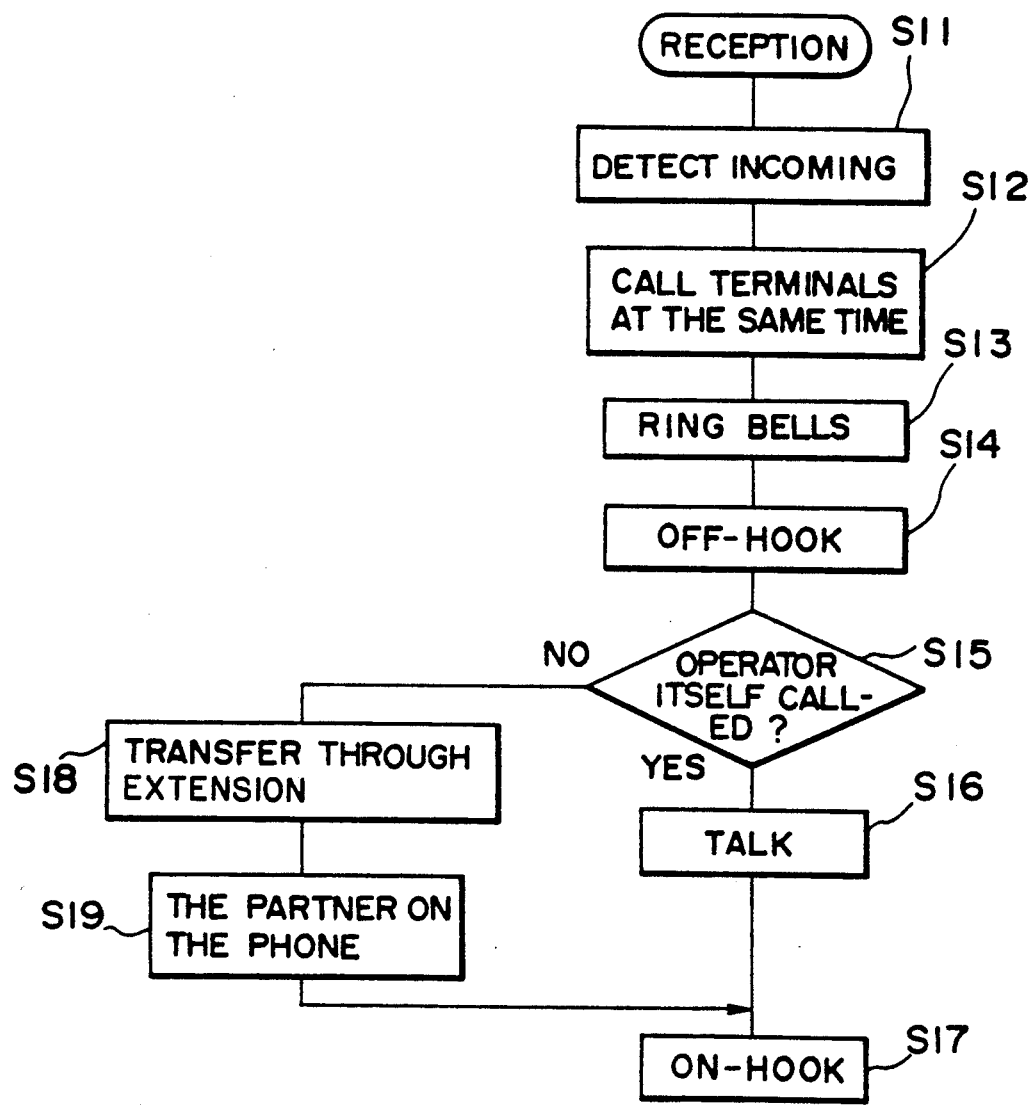
FIG. 3 is a flow chart showing receiving procedures in the apparatus shown in FIG. 1.
Figure 4:
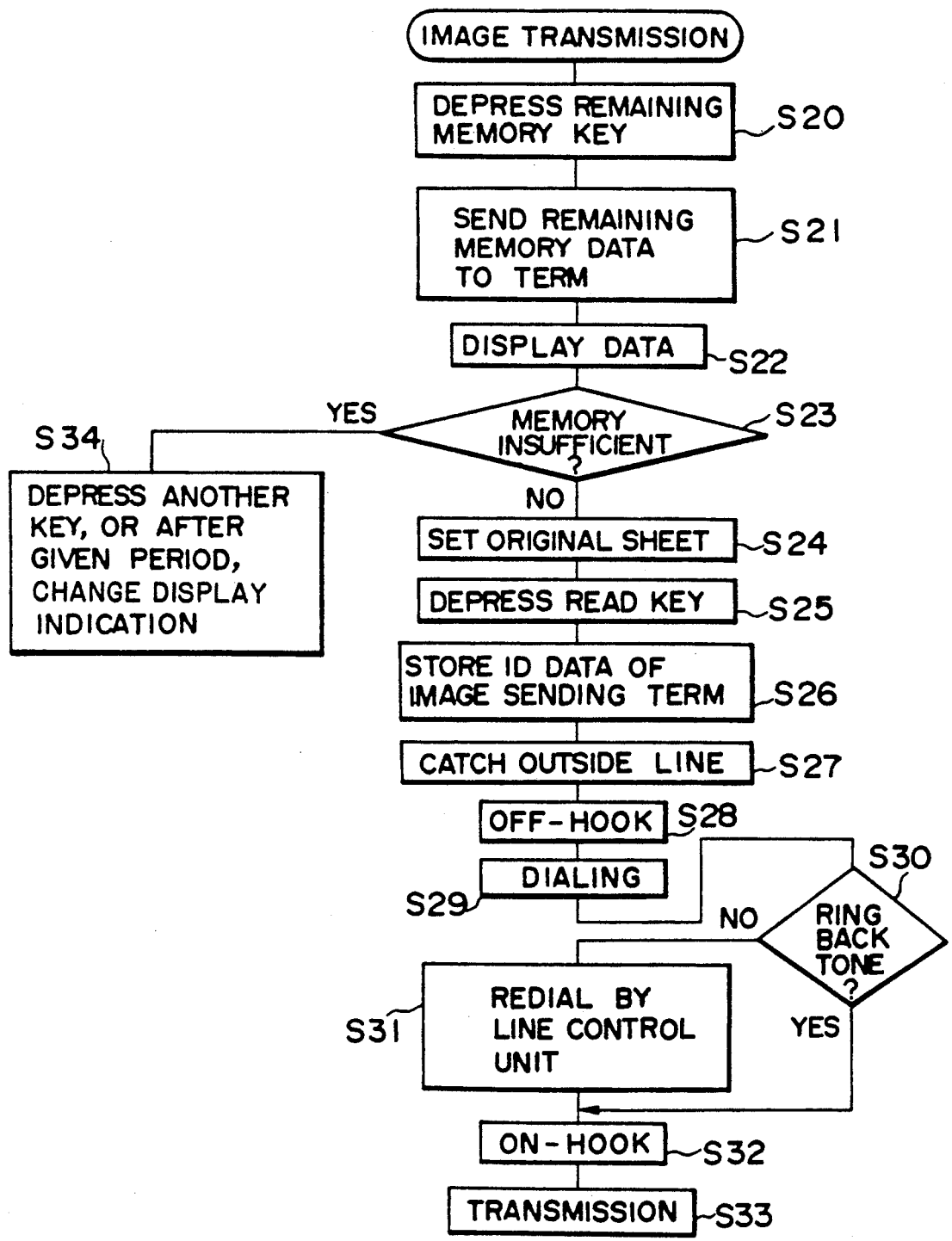
FIG. 4 is a flow chart showing control operations of image transmission in the apparatus shown in FIG. 1.
Figure 5:
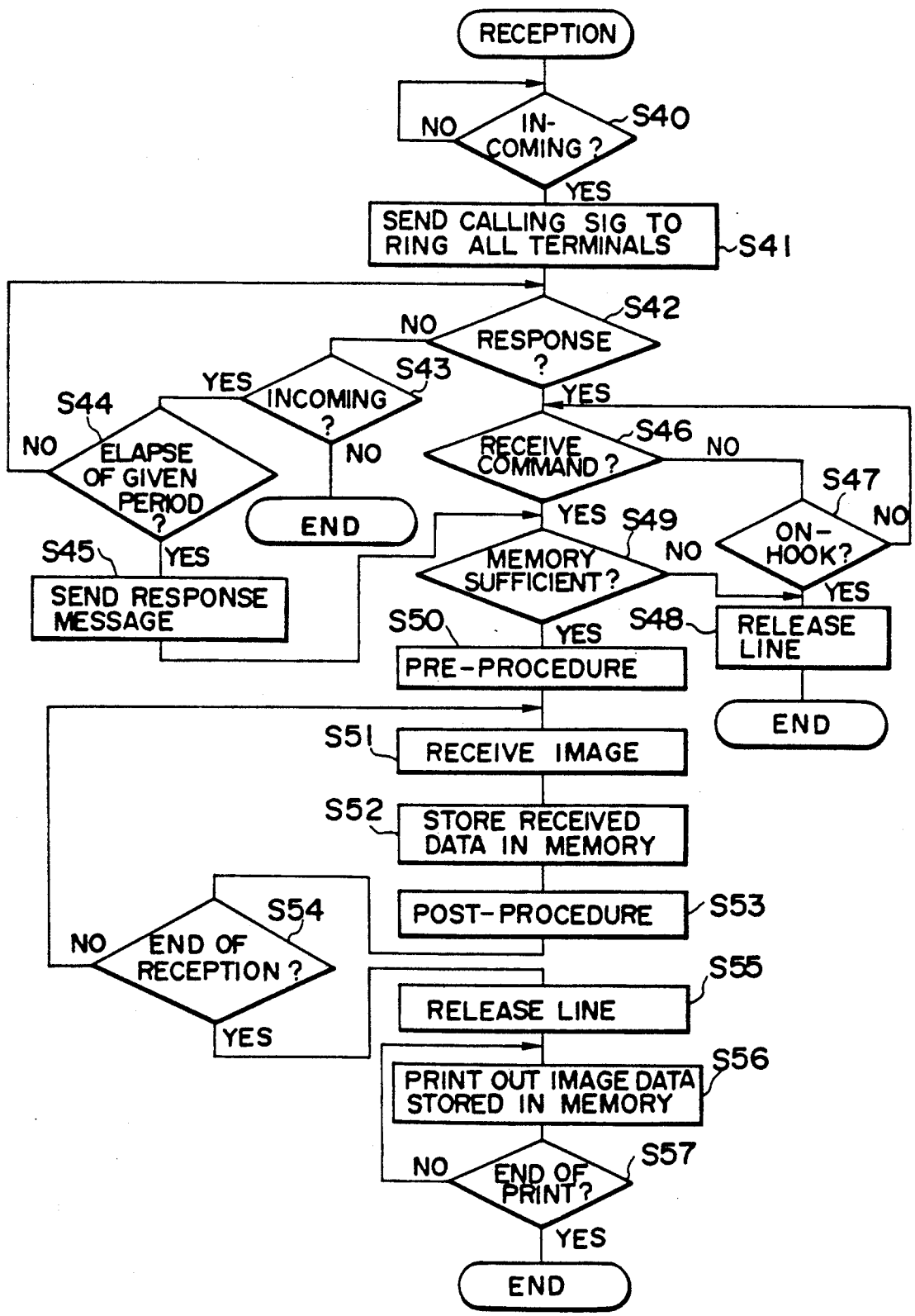
FIG. 5 is a flow chart for explaining control operation of image reception in the apparatus shown in FIG. 1.

The operation of the image communication apparatus having the above arrangement will be described with reference to flow charts of FIGS. 2 to 5. FIGS. 2 and 3 are flow charts showing send and receive procedures in the system, and FIGS. 4 and 5 are flow charts showing image transmission and reception control operations, respectively.

When an outgoing call is made by speech communication, the operator checks a state of the display circuit 215 in step S1 to judge whether the telephone lines 1 and 2 are unoccupied.

If the telephone lines are not unoccupied, the operator picks up the handset 211 in step S2 (off-hook) and depresses an outside line key in the function keys 214 in step S3, thereby catching the outside line.

In step S4, the operator manipulates the dial keys 213 of the multi-function telephone set 21 or 22 to cause the microcomputer 15 in the line controller to send a predetermined signal through the microcomputer 212. In response to this signal, the microcomputer 15 uses the dial calling circuit 13 to send a dial signal to the telephone line 1 or 2 to access the partner's terminal.

In step S5, the operator confirms a ring back tone sent back through the handset 211. When the operator hears the ring back tone, the flow advances to step S6. Otherwise, the flow advances to step S9. An on-hook state of the handset 211 is detected in step S9. When a given period of time has elapsed, calling operations are repeated in step S10.

The operator waits for the partner in step S6. When the partner responds, the operator talks with the partner in step S7. Speech communication is completed when an on-hook state of the handset is detected in step S8.

The procedures in FIG. 3 are performed for speech communication in response to the partner.

When the calling signal from the partner is detected by the incoming detector 11 or 12 in step S11, the microcomputer 15 in the line controller 10 simultaneously accesses all terminals in step S12. A ringing tone is generated at each terminal in step S13.

When the off-hook state of the handset 211 of the multi-function telephone set 21 or 22 is detected in step S14, it is determined in step S15 whether an incoming call is made to the operator himself. If the partner wants to talk to another operator, the flow advances to step S18.

If the incoming call is made for the operator, he talks with the partner in step S16, when the on-hook state of the handset is detected, speech communication is executed, when if on-hook in step S17, the speech communication is terminated.

On the other hand, if the incoming call is made for another operator, the operator in step S18 manipulates the function keys 214 to perform extension transfer while the telephone set is kept held. When to another operator answers the phone, the flow advances to step S17. The operator performs the on-hook operation to transfer the communication to the another operator.

In order to perform image transmission by using the image reader circuit 220 in each terminal, the procedures in FIG. 4 are performed.

In image transmission, a given operator depresses a remaining memory key in the function keys 214 of the multi-function telephone set 21 or 22. The microcomputer 212 receives information as to whether the memory level key is turned on, so as to provide a predetermined signal to the microcomputer 15. In step S20 of FIG. 4, the predetermined signal is input to the microcomputer 15 in the line controller 10. The microcomputer 15 calculates a remaining memory data capacity of the image memory circuit 332. The calculated capacity data is transferred to the multi-function telephone set in a predetermined form, e.g., in the form of pages of the standard originals in step S21.

The data representing the remaining memory data capacity of the image memory circuit 332 is output to the microcomputer 212 of the multi-function telephone set 21 or 22. The microcomputer 212 causes the display circuit 215 to display the remaining memory data capacity in accordance with the data input from the microcomputer 212.

The operator visually checks the remaining memory data capacity of the image memory circuit 332 and determines whether this capacity is sufficient for image data to be transmitted. Instead of judging the capacity by the operator, the data to be transmitted may be input and compared with the remaining memory data capacity in step 23, thereby determining whether the remaining memory data capacity is sufficient. If the remaining memory data capacity is determined to be insufficient, an input from another key is accepted in step S34, thereby canceling the transmission command i.e., changing the display indication.

When the remaining memory data capacity of the image memory circuit 332 is sufficient, the operator checks that an original to be transmitted is set in the image reader circuit 220 in step S24.

In step S25, the operator depresses the read key in the function keys 214 of the multi-function telephone set 21 or 22 and a key input signal is received through the microcomputer 212. Reading of an image of the original set in the image reader circuit 220 is started.

The read image data is transferred from the image reader circuit 220 to the image memory circuit 332 in the line controller 10 and is stored in the image memory circuit 332. In this case, in step S26, the microcomputer 15 stores terminal identification data (e.g., a terminal machine number, an extension number, and the like) of the terminal from which an image is transferred to a predetermined area of the RAM.

In step S27, the operator depresses the outside line key in the multi-function telephone set 21 or 22, and the depression signal is fetched through the microcomputer 212 to catch the outside line.

In steps S28 and S29, input detection of the off-hook signal from the handset 211 and dialing with the dial keys 213 are performed. An outgoing call is made in accordance with the same operations described above. The dialed telephone number is stored in the RAM in the line controller 10.

It is determined in step S30 whether a ring back tone signal from the telephone line is received. If NO in step S30, the flow advances to step S31. In step S31, the telephone number used for calling is stored in the RAM, calling is performed again by using the telephone number when a predetermined period of time has elapsed.

When the on-hook signal is detected in step S32, the microcomputer 15 sequentially reads out the image data from the image memory circuit 332. The readout data is modulated by the modulation circuit 331, and the modulated signal is sent onto the transmission line. The transmission procedures are the same as those of the conventional facsimile machine.

When image data is received in response to reception of an incoming call through an outside line, the facsimile machine 23 is manually or automatically operated in a known manner. The received data is then recorded. In a system wherein a facsimile printer is connected in place of the facsimile machine 23, the image data received under the control of the micrcomputer 15 is stored in the image memory circuit 332. The image data is then transferred from the image memory circuit 332 to the printer.

FIG. 5 is a flow chart showing control operations of the microcomputer 15 when image reception is performed.

When calling from the telephone line is detected by the incoming detector 11 or 12, the microcomputer 15 detects the incoming call in step S40 and the flow advances to step S41. The microcomputer 15 sends calling signals to microcomputers of all telephone sets 21 and 22 to ring all the telphone sets. Line information is sent to each telephone set in order to identify the telephone line which sends the incoming call. Therefore, the microcomputer in each telephone set causes the display circuit to display that an incoming call has received.

The microcomputer 15 discriminates in steps S42, S43, and S44 whether all telephone sets respond to the calling signals within a predetermined period of time. If it is determined that one of the telephone sets responds to the calling signal in step S42, the telephone line which has received the incoming call is connected to the responding telephone set, and the flow advances to step S46. However, if the telephone sets do not respond to the calling signals within the predetermined period of time, the flow advances from step S44 to S45. Thereafter, a response message representing that the mode is shifted to a facsimile mode is sent onto the telephone line, and the flow advances to step S49. When the microcomputer 15 detects in step S43 that the incoming call ceases in elapse of a given period while no telephone sets have responded in the loop of steps S42, S43, and S44, calling is then ended.

When the flow advances from step S42 to S46, the microcomputer 15 determines whether a facsimile key is depressed at a responding telephone set. The microcomputer 15 then determines in step S47 whether the handset of the responding telephone set is set in the on-hook state. If YES in step S47, the telephone line which has received the incoming call is released from the telephone set in step S48.

When the microcomputer 15 determines in step S46 that the ON state ("receive" command) of the facsimile key is detected, the flow advances to step S49. The microcomputer 15 determines whether the remaining memory data capacity of the image memory circuit 332 is sufficient (e.g., ten or more of A4 size originals can be stored in the image memory circuit 332). If YES in step S49, the flow advances to step S50, and the facsimile mode is set, i.e., the pre-procedure is performed. However, if NO in step S49, the flow advances to step S48. Processing in step S49 may be omitted. When the microcomputer 15 determines in step S49 that the remaining memory data capacity is not sufficient, the image is received and recorded at a printer under the condition that the printer or facsimile machine is unoccupied, and then the line is released in step S48.

In step S50, the pre-procedure of facsimile communication is executed, and the communication mode is set. In step S51, the image data is received. The received data are sequentiallty stored in the image memory circuit 332 in step S52. When one-page image data reception is completed, the post-procedure of facsimile communication is performed in step S53. The microcomputer 15 determines in step S54 whether all reception operations are completed. If reception for the next page must be performed, the flow advances to step S51 and the image of the next page is received in step S51. However, when the microcomputer 15 determines in step S54 that all data are completely received, the telephone line is released in step S55. The reception data stored in the image memory circuit 332 are sequentially output to the printer to print out the data on recording paper in steps S56 and S57. The image memory circuit 332 stores image data coded by a predetermined coding scheme (e.g., modified Huffman or modified READ scheme). When image data is read out from the image memory circuit 332, the microcomputer 15 sequentially decodes the readout data. The decoded data are then sequentially output to the printer.

According to this embodiment, when an image is output in, e.g., image reception, the image data is stored in the image memory circuit 332 and then printed out when the printer is unoccupied. Therefore, many telephone sets can effectively and commonly use a small number of printers.

With the above arrangement, the image reader circuit is arranged in each multi-function telephone set as a speech terminal, and the image data read by the image reader circuit is transmitted from the corresponding multi-function telephone set. Unlike in the conventional system, the operator need not move to the location where the facsimile machine is installed, and the operator can perform image transmission at his own desk.

Since each multi-function telephone set comprises only an image reader circuit, it does not require a large space on the desk. The arrangement of the multi-function telephone set can be simplified, and therefore, equipment cost per terminal can be greatly reduced.

The present invention is not limited to the particular embodiment described above. Various changes and modifications may be made within the spirit and scope of the invention. For example, by connecting printers, the number of which is equal to that of the telephone lines, and by connecting each printer to either telephone line, reception and recording can be performed in a realtime manner.

Only one printer may be used, and image memories, the number of which is equal to that of the telephone lines, are arranged. Received data is stored in the image memories. In this case, the image data can be sequentially read out and printed out when the printer is unoccupied.

The number of telephone terminals or sets can be arbitrarily determined.

What is claimed is:

1. An image communication system, comprising:
a plurality of communication terminals each including speech communication means for effecting speech communication and reading means for reading an image; and
line control means for selectively connecting said communication terminals to at least one communication line, wherein said line control means includes input means for inputting image data from each of said terminals, means for performing a communication procedure of image data, and send means for sending the image data input from said input means to said communication line in accordance with the communication procedure, said line control means being adapted to send image data from said plural terminals.

2. An apparatus according to claim 1, further comprising means for receiving the image data and means for recording the image data.

3. An apparatus according to claim 2, wherein said receiving means includes a memory for storing the image data, the image data being recorded by said recording means after the image data is stored in said memory.

4. An apparatus according to claim 1, wherein said transmitting means includes a memory for storing the image data, the image data being transmitted after the image data from one of said terminals is stored in said memory.

5. An apparatus according to claim 4, wherein said transmitting means transmits the image data from said memory in accordance with a transmission command from said one terminal.

6. An image communication system, comprising:
a plurality of speech communication terminals each having reading means for reading an image; and
a line exchanging unit for connecting said plural speech communication terminals to plural communication lines;
wherein said line exchanging unit includes means for performing a communication procedure of image data, and transmitting means for transmitting image data from said speech communication terminals in accordance with the communication procedure, and
wherein said communication procedure means starts the communication procedure in response to a transmission command from one of said speech communication terminals.

7. An apparatus according to claim 6, further comprising means for receiving the image data and means for recording the image data.

8. An apparatus according to claim 7, wherein said receiving means includes a memory for storing the image data, the image data being recorded by said recording means after the image data is stored in said memory.

9. An apparatus according to claim 6, wherein said transmitting means includes a memory for storing the image data, the image data being transmitted after the image data from said terminal is stored in said memory.

* * * * *